G. K. SPRENGER.
MORTISING MACHINE.
APPLICATION FILED AUG. 11, 1920.
1,405,027. Patented Jan. 31, 1922.
7 SHEETS—SHEET 4.
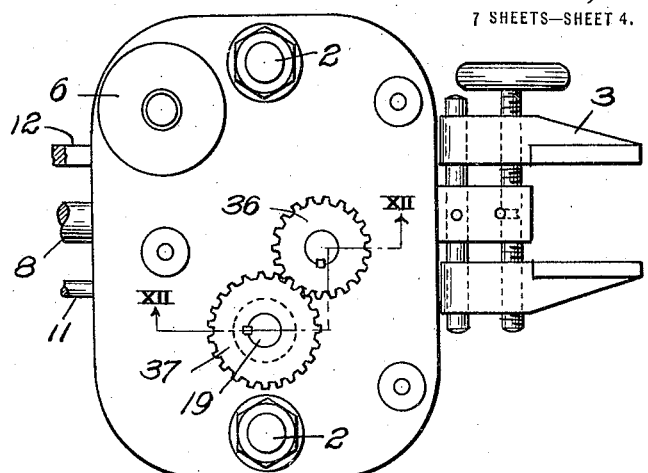
FIG. IV.
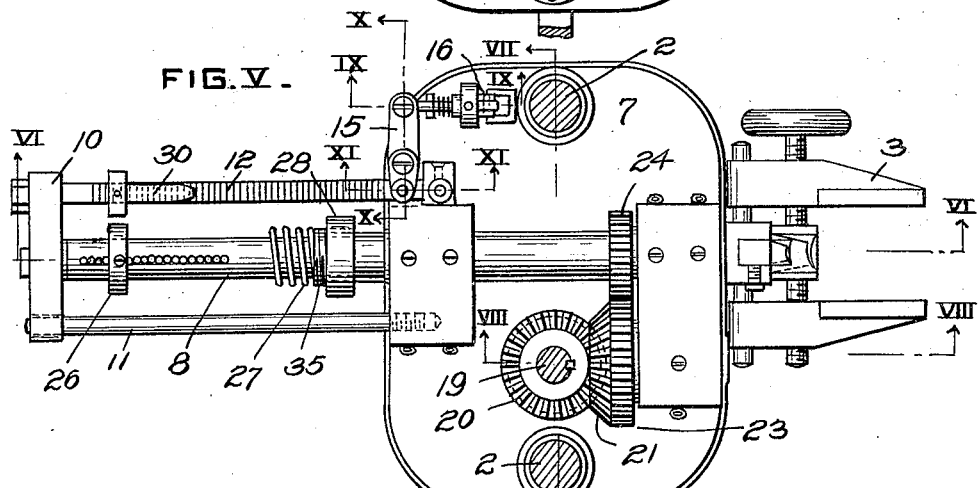
FIG. V.
FIG. VI.
WITNESSES
J. Herbert Bradley
Francis J. Tomasson
INVENTOR
George K. Sprenger
by Christy and Christy
his attorneys

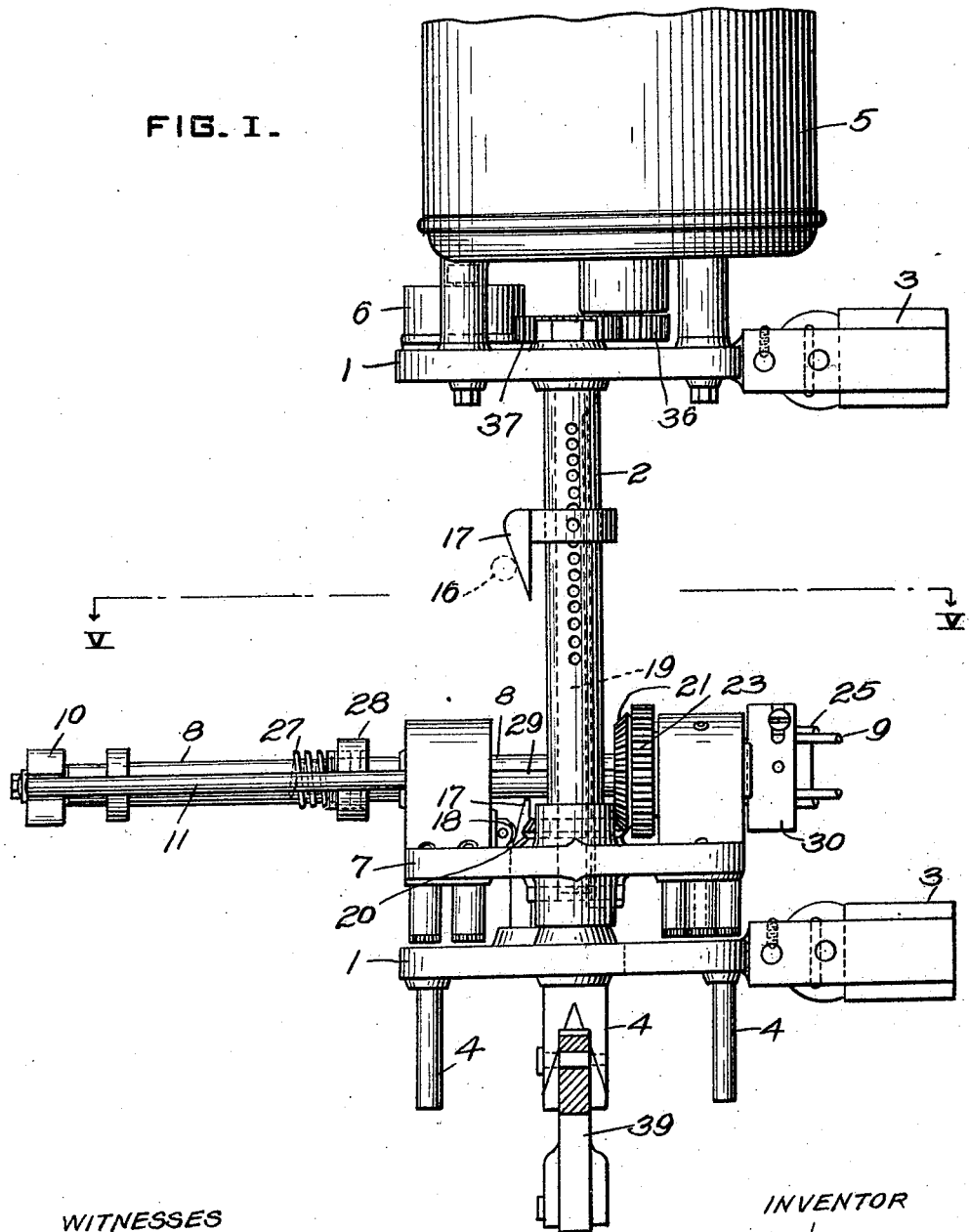

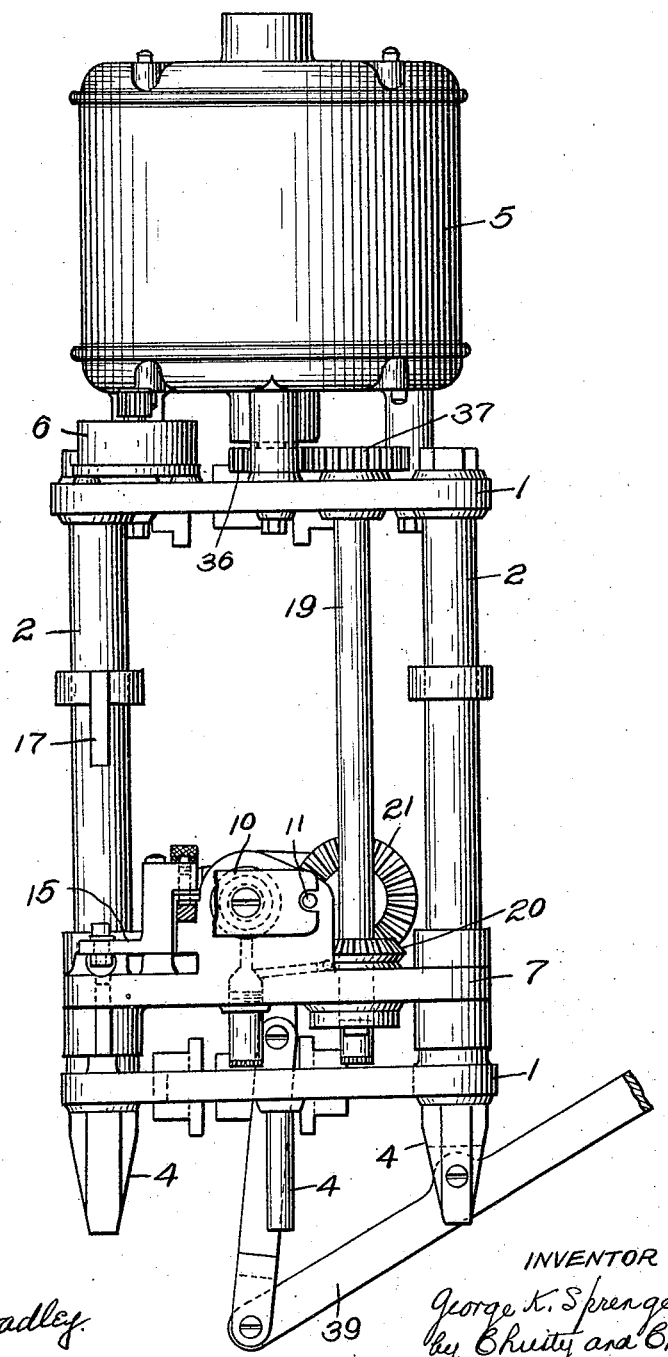

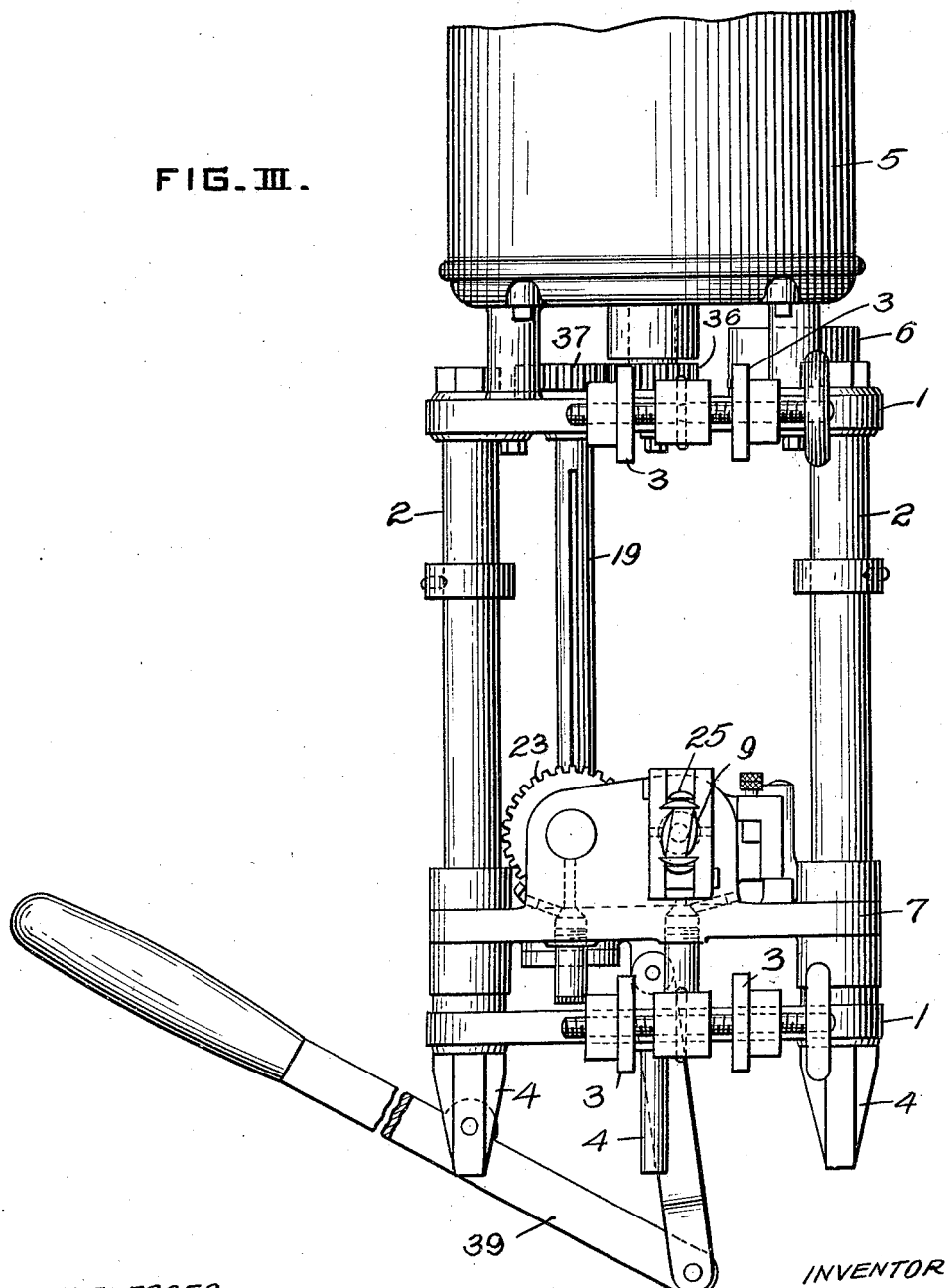

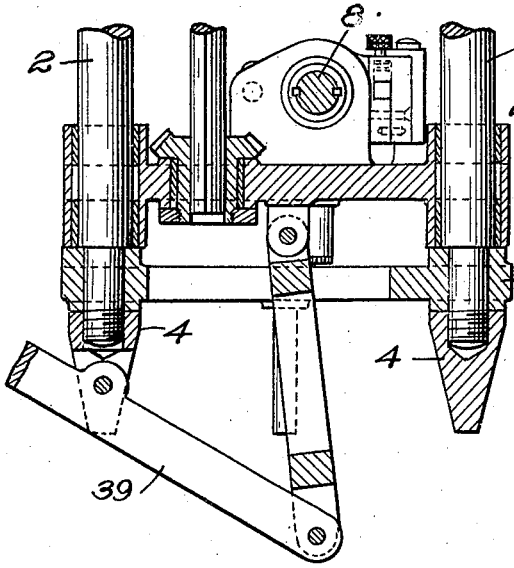
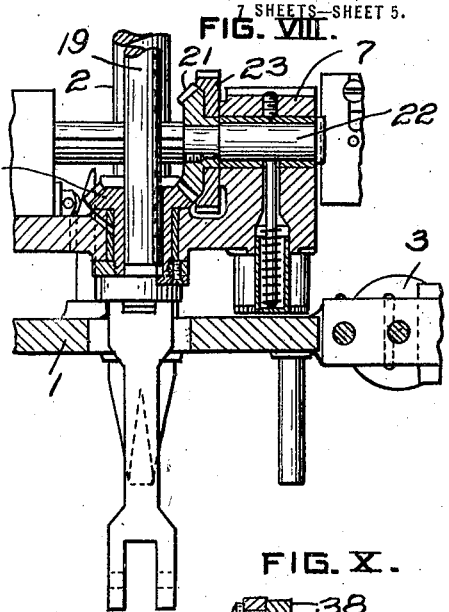
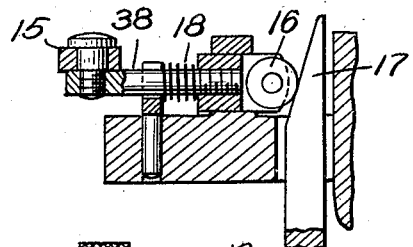
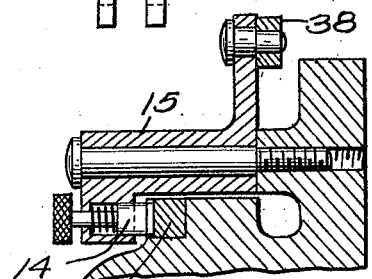
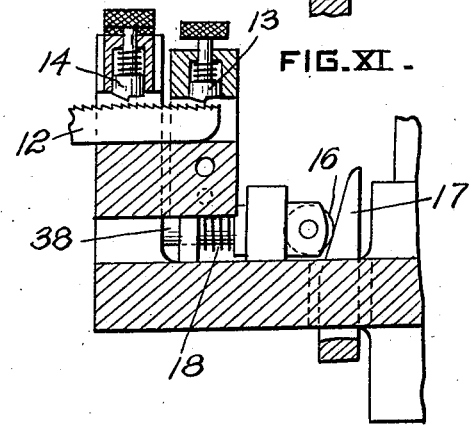
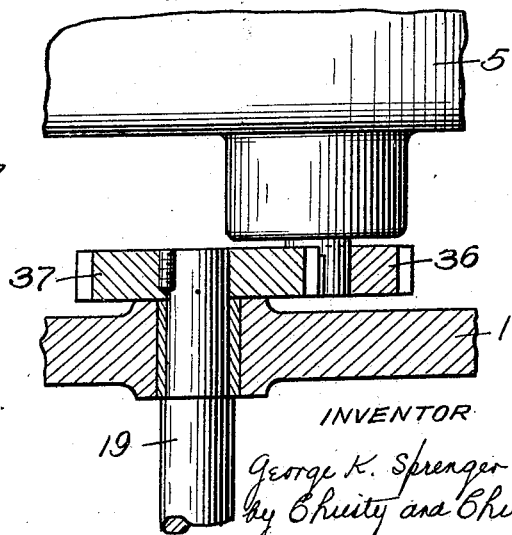

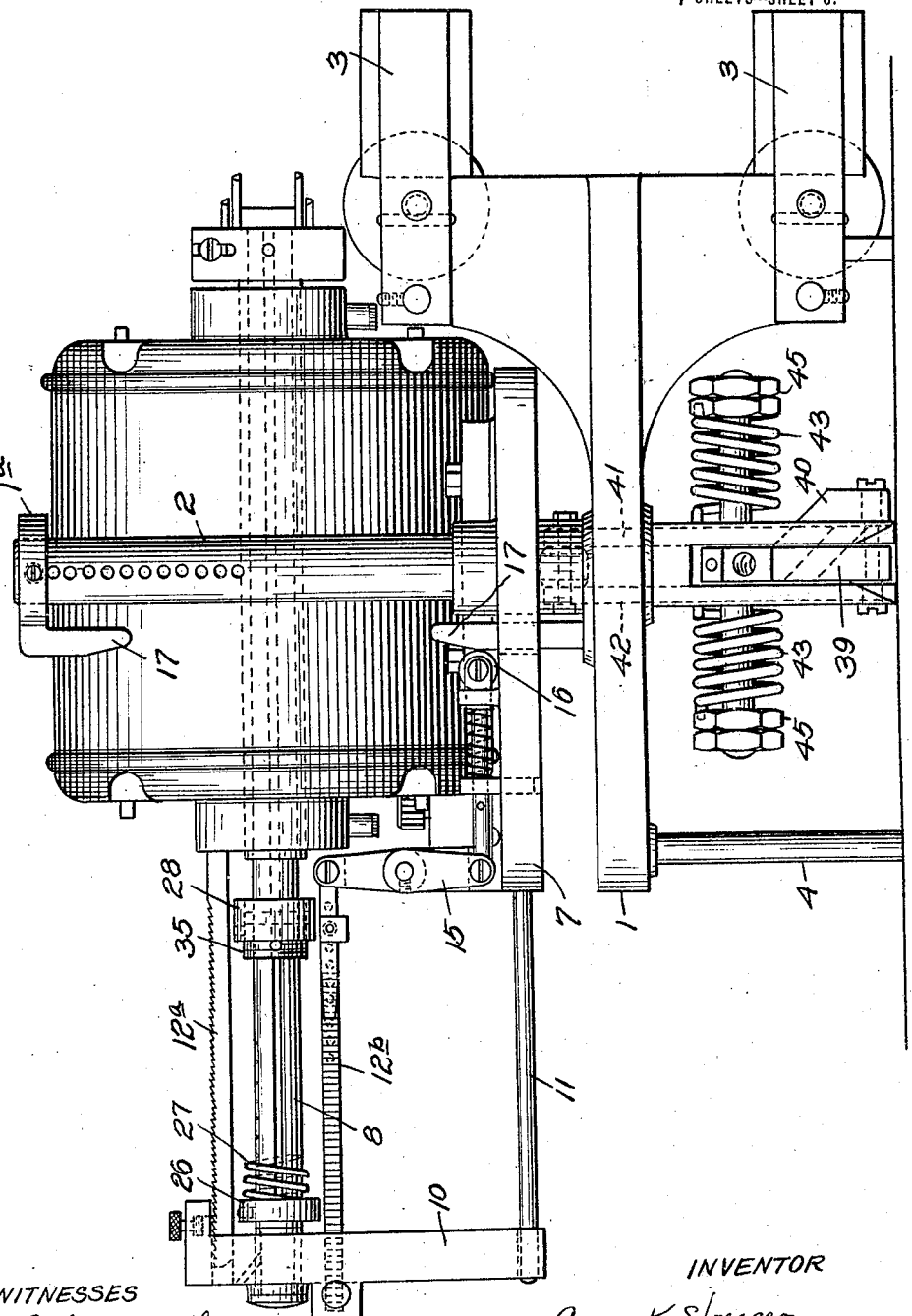

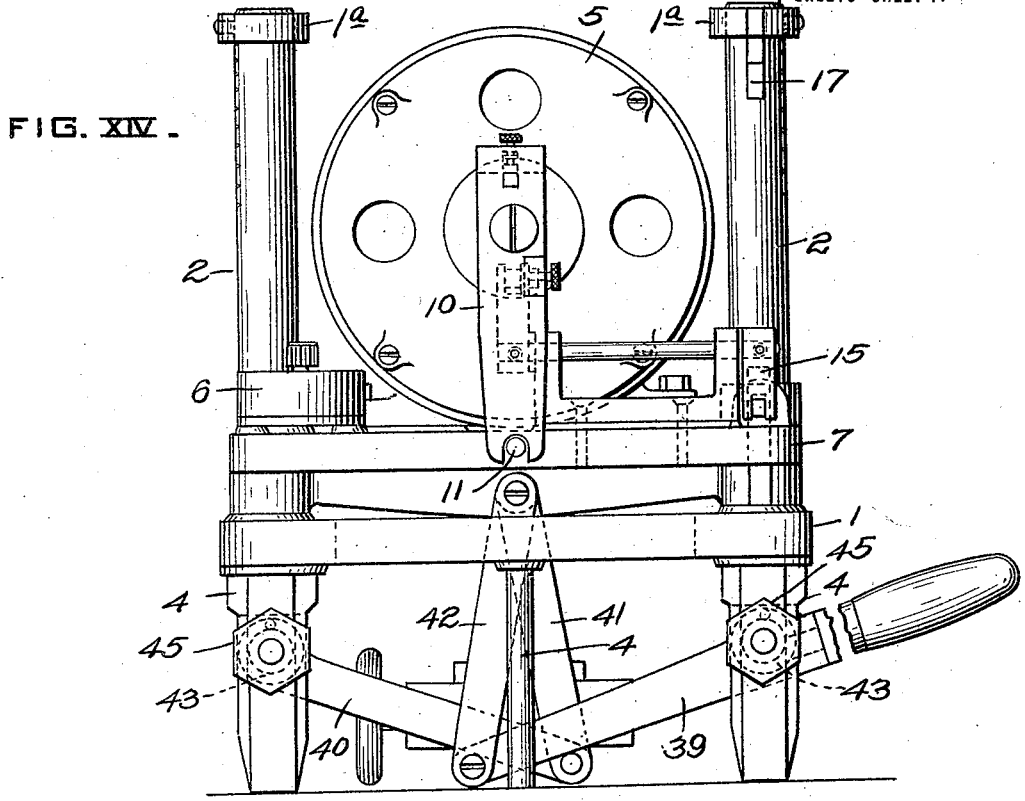
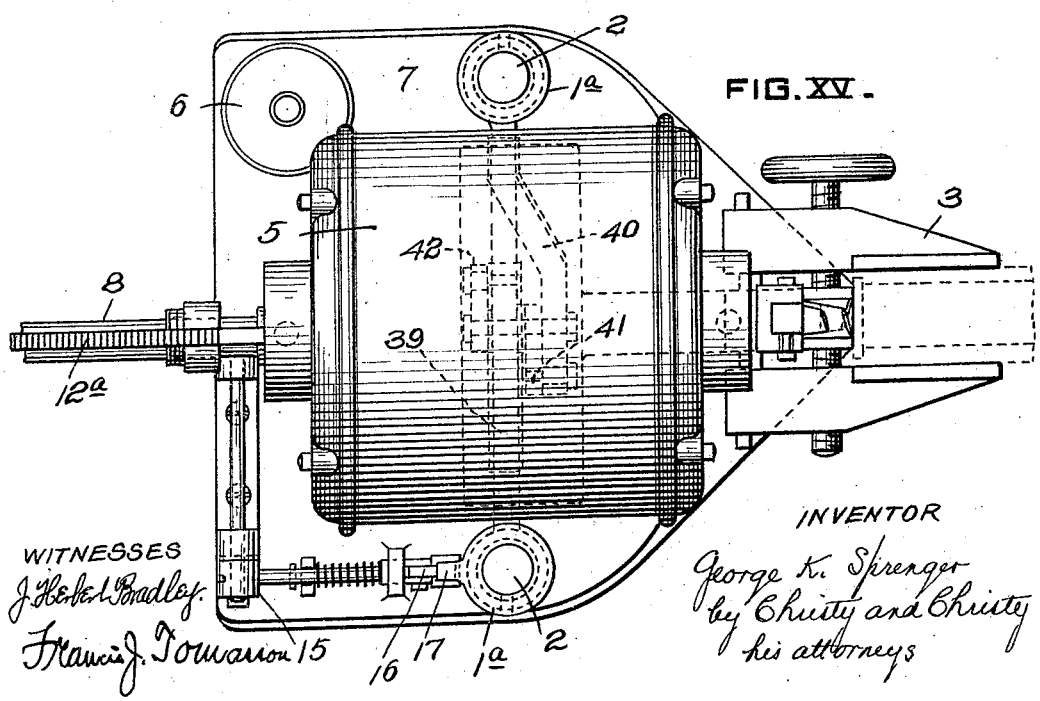

UNITED STATES PATENT OFFICE.

GEORGE K. SPRENGER, OF PITTSBURGH, PENNSYLVANIA.

MORTISING MACHINE.

1,405,027.  Specification of Letters Patent.  Patented Jan. 31, 1922.

Application filed August 11, 1920. Serial No. 402,773.

*To all whom it may concern:*

Be it known that I, GEORGE K. SPRENGER, residing at Pittsburgh, in the county of Allegheny and State of Pennsylvania, a subject of the former German Emperor, have invented or discoverd certain new and useful Improvements in Mortising Machines, of which improvements the following is a specification.

My invention relates to improvements in mortising machines, and consists of a machine easily applied wherein a simple easy movement is automatically made effective to accomplish the end desired. The machine is illustrated in the accompanying drawings.

Figure I is a view of the machine in side elevation, a portion of the motor being broken away; Figure II and III are views in elevation, from front and rear; Figure IV is a top plan view, the motor however being removed and portions of the tool-carrying apparatus being broken away; Figure V is a horizontal section, on the plane indicated by the line V—V, Figure I, looking down; Figure VI is a view in vertical section, on the plane indicated by the line VI—VI, Figure V, and this figure, like Figure V, shows only the lower portion of the machine; Figure VII is a view in vertical section, on the plane indicated by the line VII—VII, Figure V, and again showing only the lower portion of the machine; Figure VIII is again a view in vertical section on the plane indicated by the line VIII—VIII, Figure V; Figures IX, X, and XI are all views in vertical section, showing details of construction, the planes of section being indicated, respectively, at IX—IX, X—X, and XI—XI, Figure V; Figure XII is a vertical section on the planes indicated by the broken line XII—XII, Figure IV; Figure XIII is a view in side elevation, similar to Fig. I illustrating a modification; Figure XIV is a view of the machine of Fig. XIII in front elevation, and Fig. XV is a view in plan.

The machine consists essentially of a frame composed of opposite heads 1, spaced apart by columns 2 at a convenient interval, exceeding the length of the maximum mortise to be cut. The two heads are provided each with a clamp 3, by which clamps the work, the edge of a door for example, may be engaged and by such engagement the machine supported in proper position for operation. The lower of the two heads 1 is further conveniently provided with feet 4 upon which the machine may stand when not in use. One of the feet 4 serves a further purpose, presently to be mentioned again, as a stud in which to pivot a certain operating lever. Upon the upper head 1 is mounted a drive motor 5, which will be understood to be an electric motor controlled by means of a switch 6.

Between the opposite heads 1, 1, and guided by posts or columns 2, is a rising and falling tool carriage, 7. The cutting tool 9 is carried upon the end of a shaft 8 journalled in housings in carriage 7 in such manner as to permit rotation and longitudinal impulsion in axial direction. The particular position of the tool with respect to the carriage is such that when the machine is clamped to the edge of a door, the rotating tool may advance in the medial plane of the door to sink a mortising cut at a proper place in the edge of the door. The rise and fall of carriage 7 provides for the proper elongation of the cut in the direction of the height of the door.

Vertical movement is imparted to the carriage, and so to the tool, by the instrumentality of the hand lever 39, pivoted, as has just been remarked, to a stud in the lower head 1, conveniently one of the feet 4. Transverse movement of the tool, the extension and the retraction of the stem 8, is accomplished by the instrumentalities shown in detail in Figures V, IX, and X, XI. A guide-rod 11 is rigidly secured in and extends from carriage 7 in the direction of tool advance; upon this rod 11 slides a block 10; to block 10 is secured a rack-bar 12 (cf. Figure XI). Two spring backed teeth 13 and 14 engage this rack bar. These teeth are borne, both of them, by carriage 7; one tooth, 13, has vertical movement only, the other, 14, is borne on the end of a lever 15 pivoted in the carriage. As lever 15 swings, tooth 14 is carried in a direction longitudinal of rack-bar 12. The lever 15 is caused to swing periodically (from left to right, Fig. XI) as the carriage 7 is raised and lowered, by engagement of a friction roll 16 borne on the end of a push-bar 38 (the push bar being pivotally pinned to one end of lever 15) with the inclined-faced stops 17, suitably arranged at the limits of carriage movement. When, after a left-to-right shift of tooth 14, carriage 7 moves and sets roller 16 free of engagement with stop 17, a spring 18, encircling push-bar 38, throws the bar from left to right (Fig. IX) with the effect that tooth 14 recedes along the rack from right to left (Fig. XI). Referring now to the general view, Figure I, it will be perceived that, with each reciprocation of carriage 7, up or down, tooth 14 will be shifted, first forward and then back, and with each forward shift head 10 will be correspondingly carried from left to right, through a predetermined interval. Head 10, engaging as it does the shaft 8, of the tool, (as is best shown in Figure VI), effects by its left-to-right movement a corresponding advance of the tool.

The upper one of the two stops 17 is, as is best shown in Figure I, adjustable in its position, so that, whatever be the range of movement determined by the operator, the tool will be moved, step by step, inward with each rise and fall in cutting out of the recess in the door. The lower stop 17 also might manifestly be made adjustable in position.

The tool does its cutting by rotation. A shaft 19, suitably journaled in the opposite heads 1 of the machine, is, so long as the motor is energized, constantly driven, through gearing 36, 37, best shown in Figs. IV and XII. Carriage 7 bears in a suitable support a miter gear 20, splined to shaft 19 and movable with the carriage longitudinally of the shaft. This is best shown in Figure VIII. Meshing with the miter gear 20 is a miter gear 21 borne in carriage 7 by stub shaft 22. This stub shaft bears also a pinion 23, and pinion 23 meshes with a pinion 24, rotatable in one of the housings which carries shaft 8. Shaft 8 is splined to pinion 24, so as to be rotated thereby, but is movable in axial direction while pinion 24 is secured against such right-line movement. By these instrumentalities it will be understood the shaft 8 is constantly rotated so long as the switch 6 is closed and the motor 5 active.

It remains to be shown how the machine is adapted, not merely to cut a simple lock-receiving recess in the edge of a door, but also to form about the perimeter of that recess a rebate, to receive the flange of the lock. For cutting this rebate, a second cutting tool 25 is employed. It also is rotary and is carried by the same rotating shaft 8.

When, however, the gradual extension of the shaft 8 has reached such a point that the main recess has been sunk to or nearly to the intended depth, then a block 26 (adjustable in its particular position as shown) borne by the shaft 8, will make cushioned engagement, through spring 27 with block 28. This block is connected by the spanner rods 29 with the head 30 which carries the cutter 25. The range of movement of block 28 exceeds by a predetermined amount (say an eighth of an inch) the extent by which normally the tool 9 projects beyond the tool 25. The consequence is that, as the main tool 9 approaches the bottom of its cut and stops, the auxiliary rebate-cutting tool 25 engages the edge of the door about the margins of the main cut, and cuts the rebate; so that, when at last block 28 abuts against the body of the carriage 7, and comes to the cushioned stop, the main cut will have been sunk to the desired depth, while around its rim a rebate of the desired depth will also have been cut.

The means for adjusting block 26 in its position are manifestly such that minute adjustment may not be had. By providing block 28 with an extension 35 screw-threaded to it, adjustment infinitely minute becomes possible.

It is by virtue of the adjustability of block 26, supplemented so far as requisite or desired by the adjustability of extension 35 in block 28, that the machine may be adapted for the cutting of a mortise-cut of any depth desired having a rebated rim of standard depth. By way of illustration,—locks for doors vary in size. They are as a matter of general practice set in mortised recesses in the edges of doors and secured by flanges which, when the lock is in place, lie in the rebated rims of the mortise cuts. The flanges are ordinarily of substantially constant thickness. It is to meet this condition that I have designed a mortising machine which by a proper preliminary setting will cut a mortise cut deep enough to receive the proper lock to be applied, the mortise cut being provided when it is finished by a rebated rim cut to a proper depth to receive the flange of the lock.

A shield 30$^a$ (see Fig. V) may be provided, borne by rack-bar 12, overlying a portion of the rack and adjustable in its position. This shield 30$^a$ may be adjusted in its position as may be desired, as operation progresses it comes at length between tooth 14 and the rack, and its effect is to limit (independently of any engagement of block 28 with the body of carriage 7) the advance of the shaft 8, affording a definite stop when the tool has cut to the desired depth.

It will be seen that the whole instrument is immediately under the control of the operator. He clamps it to the door and, having adjusted his various stops 17, 26 and 30, moves switch 6 to set the cutting tools into rotation; then he takes hold of lever 39 and moves it fast or slow as cutting conditions are hard or easy, first in one direction then in the other. As in this movement the tool comes to the end of its range of predetermined movement it automatically sinks deeper into the wood, and when the vertical limit of the intended cut is reached the operator reverses the movement which he manually imparts to the lever 39. As the mortise approaches completion, the rebating tool 25 will automatically come into play, to perform its particular office, already described. It will be understood however that the rebate tool need not be employed, unless desired, and will not be employed, unless block 26 be properly adjusted, to bring it into play.

The machine shown in Figs. XIII–XV is an improvement upon that shown in Fig. I and minutely illustrated in Figs. II–XII. The improvement consists in mounting the motor 5 upon the carriage 7, and making the tool shank 8 the shaft of the motor 5. In this arrangement shaft 19 with gearings 36, 37, 20, 21, 23, and 24, are dispensed with, and this with manifest simplification and concomitant advantage. Incidental advantageous changes may be summarily noted: One of the two plates 1 of the machine first described is dispensed with, and posts 2 are provided with adjustable collars 1ª, one of which conveniently carries the wedge 17. The racks 12 of the machine first described here advantageously become two racks, 12ª and 12ᵇ, one of which is engaged by tooth 13 the other by tooth 14.

I find it advantageous, in this my improved machine, to make provision that the weight of the motor, now borne by the carriage shall be counterbalanced, wholly or in part, and so the operator may swing lever 39 and move the carriage with ease and freedom. To this end, the connection between hand lever 39 and carriage 7 is through the toggle connection best shown in Figs. XIV and XV. Hand lever 39 is pivoted in the machine frame, as in the other case, and a duplicate 40 of the weight arm of lever 39 is pivoted oppositely. These two lever members are linked to carriage 7 by the links 41 and 42. The arrangement is such that manifestly the swinging of the lever 39 effects shifting of the carriage longitudinally of pillars 2. Helical springs 43, 43, 44, 44 encircle the pivot points of lever 39 and link 40, and, anchored at one end, each spring at its opposite end engages the pivoted member, and exerts its tension upon it, tending to swing it, and by swinging it to raise the weighted carriage 7 against gravity. These springs are conveniently arranged in pairs, as best shown in Fig. XIII, and furthermore they may advantageously be anchored in nuts 45, by the turning of which the spring tension may be increased or diminished, as desired. By such an arrangement it will be perceived that the weighted carriage is sustained on these cushioning springs, and by means of the lever 39 it may be shifted with ease and freedom.

In the ensuing claims I define what is of the essence of my invention; so long as this be adhered to my invention will be practised. I have shown and suggested permissible variation; further variation lies within the knowledge of a skilled mechanic.

I claim as my invention:

1. In a mortising machine, a frame adapted to be clamped to the work, a carriage adapted to reciprocate in the frame, a rotatable and extensible tool borne by the carriage, a motor sustained by the structure and adapted to rotate the tool, a hand lever pivoted in the frame, an operative connection between hand lever, carriage, and tool, whereby, in response to swinging of the hand lever, the carriage reciprocates in the frame and the tool is extended from the carriage in step by step advance.

2. In a mortising machine, a frame adapted to be clamped to the work, a carriage reciprocable in said frame, an extensible cutter borne by said carriage, means operated by carriage reciprocation for automatically extending said cutter, and a cushioned stop for said cutter.

In testimony whereof I have hereunto set my hand.

GEORGE K. SPRENGER.

Witnesses:
 BAYARD H. CHRISTY,
 FRANCIS J. TOMASSON.